United States Patent
Wade et al.

[11] Patent Number: 5,630,290
[45] Date of Patent: May 20, 1997

[54] INSECT SWATTING AND COLLECTING APPARATUS

[76] Inventors: Bill R. Wade; Thelma L. Wade, both of P.O. Box 157, N. 1025th St., Farmington,, Wash. 99128

[21] Appl. No.: 254,251

[22] Filed: Jun. 6, 1994

[51] Int. Cl.⁶ .................................................. A01M 3/04
[52] U.S. Cl. .................................... 43/136; 43/137
[58] Field of Search ........................ 43/136, 114, 137

[56] References Cited

U.S. PATENT DOCUMENTS

| | | | |
|---|---|---|---|
| 884,213 | 4/1908 | Schmidt | 43/136 |
| 1,005,443 | 10/1911 | Luckett | 43/136 |
| 1,083,179 | 12/1913 | Armstrong | 43/136 |
| 2,618,882 | 11/1952 | Martin | 43/137 |
| 4,787,171 | 11/1988 | Dagenais | 43/137 |
| 4,815,232 | 3/1989 | Rawski | 43/136 |
| 4,905,408 | 3/1990 | Wu | 43/137 |
| 5,058,314 | 10/1991 | Frascone | 43/136 |
| 5,269,092 | 12/1993 | Cobble | 43/137 |
| 5,351,436 | 10/1994 | Spalding et al. | 43/137 |

*Primary Examiner*—Jeanne Elpel
*Attorney, Agent, or Firm*—Oldham & Oldham Co., LPA

[57] ABSTRACT

A bug collection apparatus comprising a frame with a handle portion. Extending from the frame is a removable net with an adhesive disposed thereon. In some embodiments, the net also has an insecticide disposed thereon. The net is supported in the frame by a mounting member, which is mounted in a semi-circular portion of the frame. The mounting member is removable from the frame and is held in place by a retaining peg. The apparatus is further adapted to prevent the net from contacting a surface on which it is placed when not in use.

16 Claims, 5 Drawing Sheets

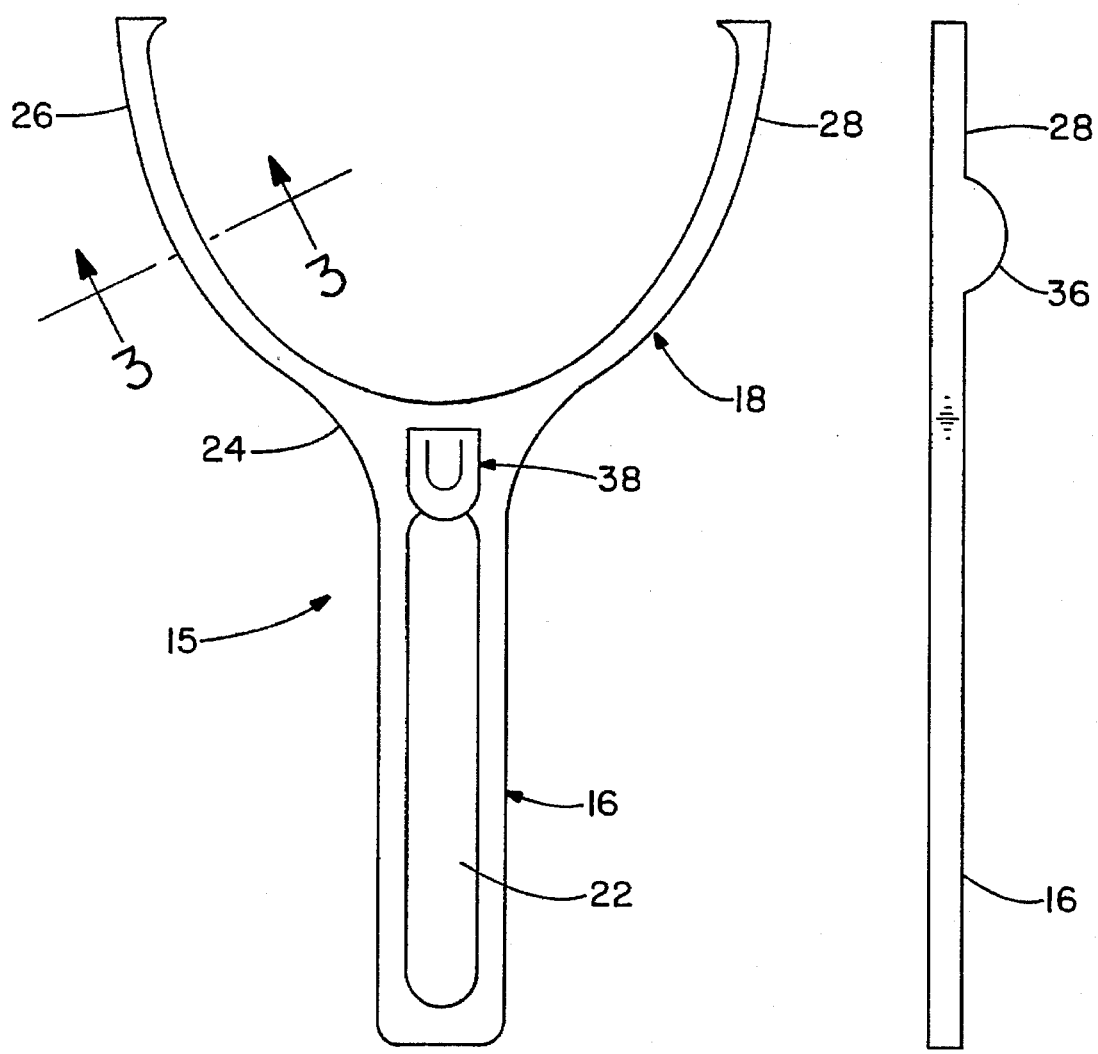
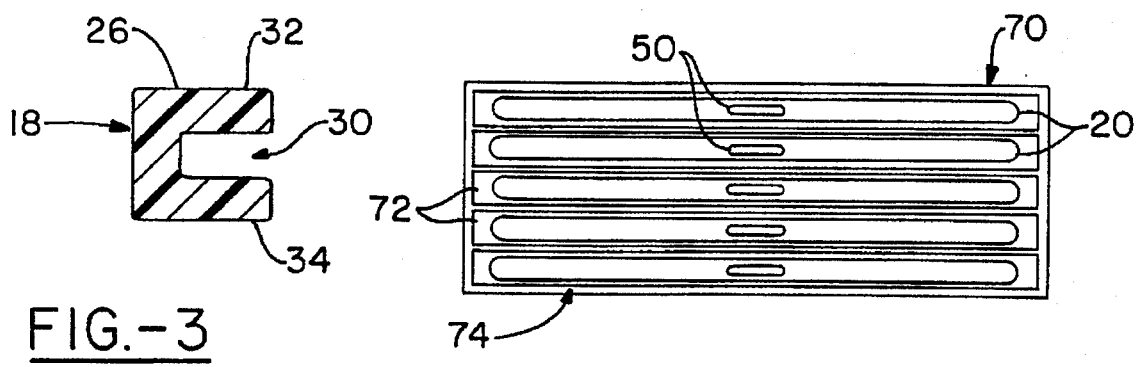

INSECT SWATTING AND COLLECTING APPARATUS

FIELD OF INVENTION

The present invention relates generally to bug control devices and more specifically to a hand-held swatting and collecting apparatus having a disposable collection member designed to contact and adhere to bugs swatted with the apparatus.

BACKGROUND OF THE INVENTION

Crawling or flying insects are considered to be pests by many people. When one of these undesirable creatures makes its presence known inside of one's home or elsewhere, it has thus far been necessary to spray the insect with an insecticide or to use a fly swatter or other object to kill the insect. The former results in a fume filled room and the latter results in the unpleasant and unsanitary condition of insect residue being left behind on the surface where the bug was killed and on the fly swatter itself as well as the need to dispose of the insect. In many instances, the use of a fly swatter will not kill the insect, requiring repeated swats or physically picking up and killing the insect. Many people have a great aversion to handling insects in this manner. Additionally, because fly swatters are used repeatedly, they become soiled and must eventually be washed off or thrown away.

SUMMARY OF THE INVENTION

It is a main object of the present invention to provide an effective means of controlling flying and crawling insects.

It is a further object to provide an apparatus for swatting, collecting, and disposing of insects in a sanitary manner.

To achieve these and other objects and in accordance with the purpose of the invention, the invention comprises a frame having a handle portion and means for mounting a collection member extending from the handle. The collection member contacts and captures insects and includes an outside support configured to be removably mounted with the frame. The collection member has at least one flexible surface with an adhesive to contact and retain the insects thereon.

BRIEF DESCRIPTION OF THE DRAWINGS

These and additional objects and advantages of the present invention will be further understood in reading the detailed description which follows in conjunction with the drawings, wherein:

FIG. 2 is a front plan view of the frame for the embodiment depicted in FIG. 1;

FIG. 3 is a side view of the frame shown in FIG. 2;

FIG. 4 is a cross-sectional view taken along line 3—3 of FIG. 2;

FIG. 10 is a end elevation view of the case as shown in FIG. 9.

DETAILED DESCRIPTION OF THE INVENTION

Figure 1:
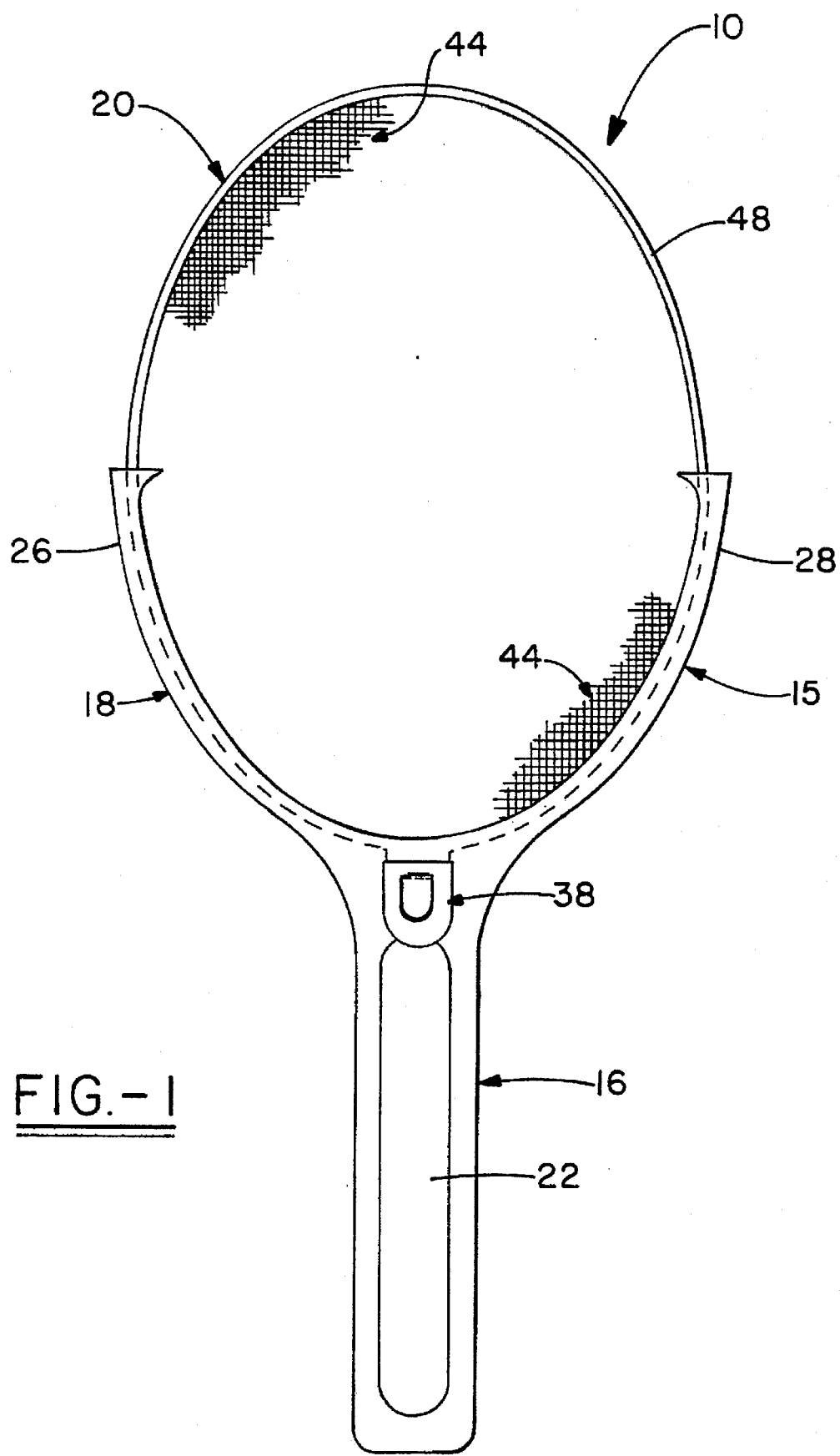
FIG. 1 is a front plan view of a preferred embodiment of the present invention.

Reference will now be made in detail to the preferred embodiment of the invention, an example of which is illustrated in the accompanying drawings. Wherever possible, the same reference numerals will be used throughout the drawings to refer to the same or like parts.

The invention 10, shown generally in FIG. 1, comprises an apparatus which is designed to be hand-held, lightweight, and used to swat flying or crawling insects for collection and disposal of such insects in a convenient and simple manner. The apparatus 10 generally comprises a frame 15 having a handle portion 16 and means 18 for mounting a collection member 20. The collection member 20 is configured to be removably mounted in association with the frame 15, to form a racquet-type assembly. The collection member 20 is preferably formed in an oval or circular configuration, so as to extend well above the frame 15 and provide a large surface for contacting and retaining insects as will be hereinafter described. In association with member 20, at least one surface is provided as a flexible surface having an adhesive thereon to contact and retain insects. The mounting means 18 associated with the frame 15 preferably provides rigidity for the collection member 20 to allow a substantial force to be applied when swatting insects using the apparatus 10. As collection member 20 is removable from frame 15, after a number of uses of the apparatus to collect and retain insects therewith, the entire member 20 may be disposed of and a replacement inserted into the apparatus 10 for continued use. The apparatus 10 provides a simply used swatting apparatus which catches and retains insects easily and effectively and provides for simple disposal of the insects.

Turning now to FIGS. 2–5, the frame 15 is shown in more detail, and is provided as a substantially rigid body which is preferably made from plastic or any other suitable material as is known in the art. The lower region of frame 15 forms a handle 16 to be gripped by the hand of the user. The handle 16 may be of any sufficient length to allow it to be grasped by the hand of the user, and may be provided with means 22, such as a strip of material or the like, to increase friction with the hand and facilitate grasping. Although shown to have a generally rectangular cross-sectional shape, any desired shape is contemplated for the invention.

In the preferred embodiment, the upper region of frame 15 is formed in the shape of a semi-circle. Those skilled in the art will recognize that the shape of the upper region of frame 15 need not be semi-circular. The upper region of frame 15 and the handle 16 join at approximately the midpoint of the semi-circumference of the semi-circle in a throat region 24. The upper region of frame 15 provides the means 18 for mounting the collection means 20. In the preferred embodiment, the means 18 comprises first and second side members or arms 26 and 28 which extend upwardly from throat region 24 of frame 15. The members 26 and 28 provide side support for the collection member 20 to support the collection means 20 in a rigid manner.

As shown in FIG. 3, the support means 18 comprising first and second side members 26 and 28 is designed to accept and support the collection member 20 as shown in FIG. 1. In the preferred embodiment, the side members 26 and 28 have a U-shaped form to provide an inwardly facing slot which extends around the entire semi-circumference formed by the members 26 and 28. The side walls 32 and 34 provide rigid support for the collection member 20 when inserted therein. As shown in FIG. 4, the frame 15 may also include tabs 36, preferably formed on at least one side of the first and second side members 26 and 28, which will hold the frame 15 and collection member 20 to be supported therein at an inclined position relative to a flat surface on which the apparatus 10 may be positioned when not in use. The tabs 36 will hold the collection member 20 off of a surface to prevent its adherence to the surface, and to keep any insects captured on the collection member off the surface.

Figure 5:
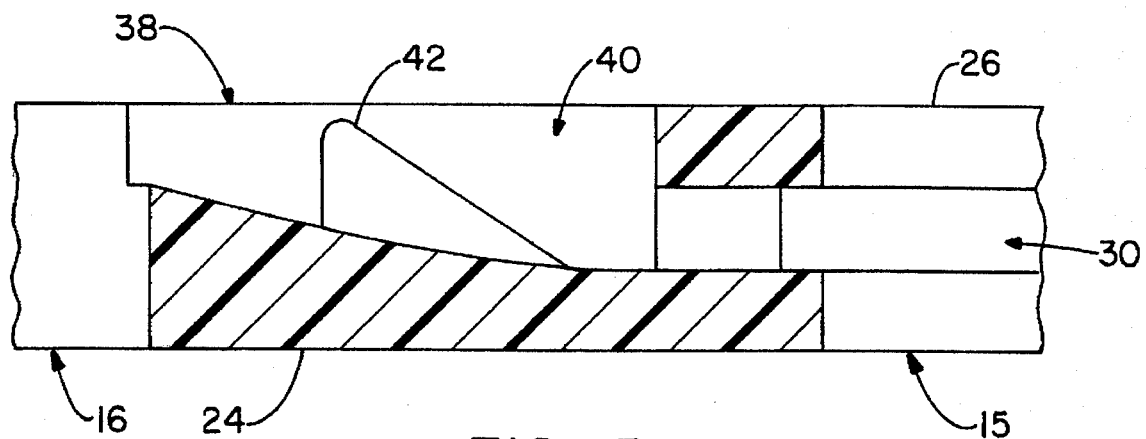
FIG. 5 is a partial cross-sectional view of the retaining means of the frame shown in FIG. 2.

The frame 15 also comprises a retaining means 38, shown in more detail in FIG. 5, formed in the throat region 24 of frame 15. The slot 30 formed by the first and second side members 26 and 28 of frame 15 extends through throat region 24 between members 26 and 28 and communicates with retaining means 38. The retaining means 38 in the preferred embodiment comprises a slotted region 40 in to which a portion of the collection member 20 extends from slot 30. A peg 42 is provided within slot region 40 to engage the collection member 20 and retain it in association with frame 15 as will be hereinafter described in more detail.

Figure 6:
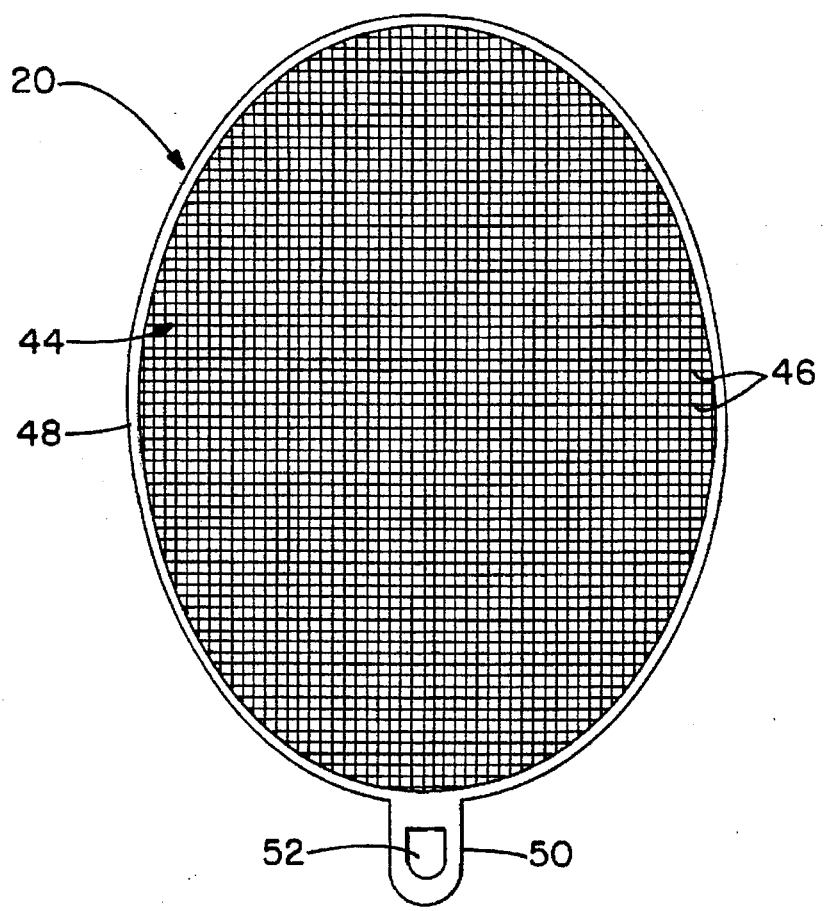
FIG. 6 is a plan view of the removable collection means of the present invention.

Turning to FIG. 6, the preferred embodiment of the collection member 20 is shown in more detail. In the preferred embodiment, the collection means 20 comprises a netting 44, being a mesh of thin fibers of material 46 in a lattice type arrangement as shown. The fibers 46 may be made of any suitable material, such as a cloth or polymer material. The netting 44 is preferably intermeshed to allow air to pass therethrough, but with the openings between the intermeshed fibers 46 being of a small size to not allow insects swatted with the apparatus to pass therethrough. The netting 44 is supported within an outer rim 48, and secured thereto by any suitable means. The collection surface provided by the netting 44 is also flexible to retain insects thereon as will be hereinafter described. At a lower portion of the rim 48, is provided an outwardly extending tab member 50 having an aperture 52 therein. The tab member 50 cooperates with the retaining means 38 as described in FIG. 5, to retain member 20 in association with frame 15 of apparatus 10.

In the preferred embodiment, the netting 44 has an adhesive applied thereto, the adhesive having a strength to contact, adhere to, and retain insects swatted with apparatus 10. As apparatus 10 is for household use, it is preferred the adhesive be non-toxic and non-permanent. The adhesive should not leave behind an adhesive residue if it does contact another surface. As the apparatus 10 is also exposed to the atmosphere, the adhesive should not cure or lose its adhesive qualities for an extended period, to allow the apparatus to be stored over an extended period of time without losing its usefulness. In an alternate embodiment of the invention, the adhesive may also be mixed with a small amount of a suitable insecticide, which will act to kill insects contacted and retained on the collection member 20 and netting 44 thereof. Again, the use of an insecticide must be compatible with the intended household use of the apparatus 10.

In the preferred embodiment, at least one surface of member 20 is flexible. In the preferred embodiment, netting 44 supported by the rim 48 will form two exposed surfaces which are flexible. The netting 44 is preferably somewhat loosely retained within rim 48, such that when an insect is adhered thereto, any attempt to escape from the surface of member 20 will result in corresponding movement of the surface so as not to allow an insect to crawl from the surface once retained thereon. It should be recognized that the collection member may have a different configuration which includes at least one flexible surface functioning in a similar manner. For example, a rigid member may serve as a base for an outer flexible membrane or layer having an adhesive material thereon, rather than the netting 44 as shown in the preferred embodiment.

Figure 7:
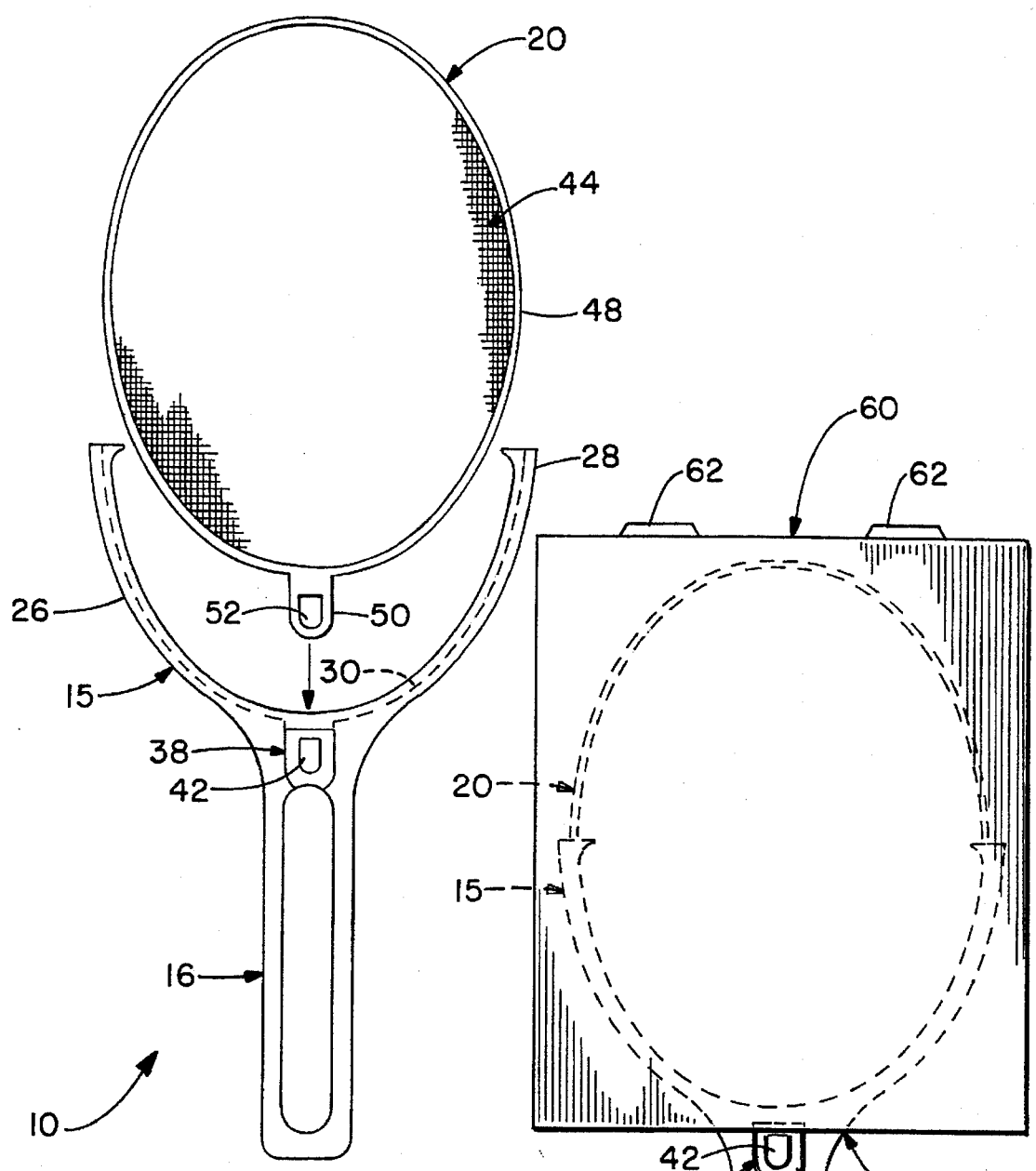
FIG. 7 is an exploded view showing assembly of the collection means with the frame.

In FIG. 7, the assembly of the collection member 20 with frame 15 is shown. As previously mentioned, the slot 30 formed in side members 26 and 28 of frame 15 slidably accepts the rim 48 of member 20. As member 20 is inserted into frame 15, the outwardly extending tab 50 is inserted into retaining means 38. The tab 50 is slid into retaining means 38, and the peg 42 engages the hole 52 formed in tab 50. This will lock the member 20 into engagement with frame 15, and provides a sturdy and rigid construction for the apparatus 10. Engagement of member 20 into frame 15 is simple and efficient, and disengagement is also easily provided by lifting tab 50 and slidably disengaging member 20 from frame 15. In the preferred embodiment, the collection member 20 may be easily disposed of by disengaging it from frame 15 to allow a replacement member 20 to be inserted therein. It should be recognized that any insects captured using apparatus 10 can be easily disposed of in this manner after one or more uses of the apparatus 10. Those skilled in the art will recognize that a variety of different mechanisms may be employed to retain rim 48 within frame 15. The arrangement shown is exemplary only and the invention is not means to be limited thereto.

As previously mentioned, frame 15 has at least one raised portion 36 (as seen in FIG. 4) preferably located on the upper region of at least one side of frame 15. The raised portion 36 is designed to prevent net 44, and the adhesive disposed on strings 46 from contacting a surface upon which the apparatus 10 is rested while not in use.

Figure 8:
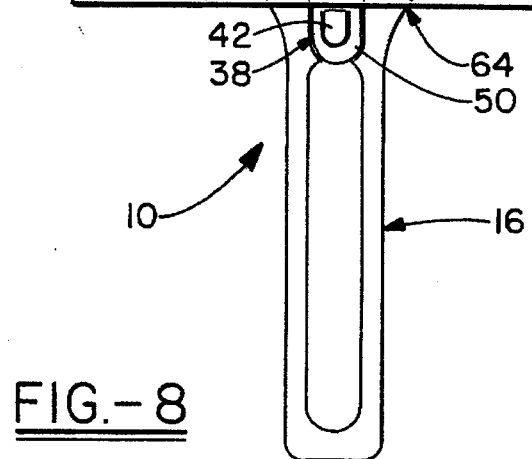
FIG. 8 is a plan view of a case for storage of the apparatus.

Turning now to FIG. 8, a storage case for the apparatus 10 is shown to facilitate simple storage of the apparatus when not in use. As previously mentioned, the preferred embodiment of apparatus 10 will include a collection 5 member 20 having a netting 44 which has an adhesive applied thereto for contacting and capturing insects. As it is desirable to avoid adherence of the netting 44 to any surface while the apparatus 10 is not in use, the case 60 will simplify storage of apparatus 10 for subsequent use. The case 60 may simply comprise upper and lower half portions which are hinged together by means of hinges 62, in a clam shell-type case, as an example. The case 60 may be constructed of a suitable plastic or other material, and is dimensioned to accept the head portion of the apparatus 10, which includes the collection means 20. As previously described, the netting or other surface provided in connection with collection member 20 is provided with an adhesive material for contacting and capturing insects. Storage within case 60 prevents adherence to another surface while being stored for subsequent use. The case 60 may include means to hang it on a wall or other suitable location for ease of use, and will include an open slot in the region 64, through which handle 16 can pass. It should be recognized that another suitable case for temporary storage of the apparatus 10 is contemplated herein.

Figure 9:
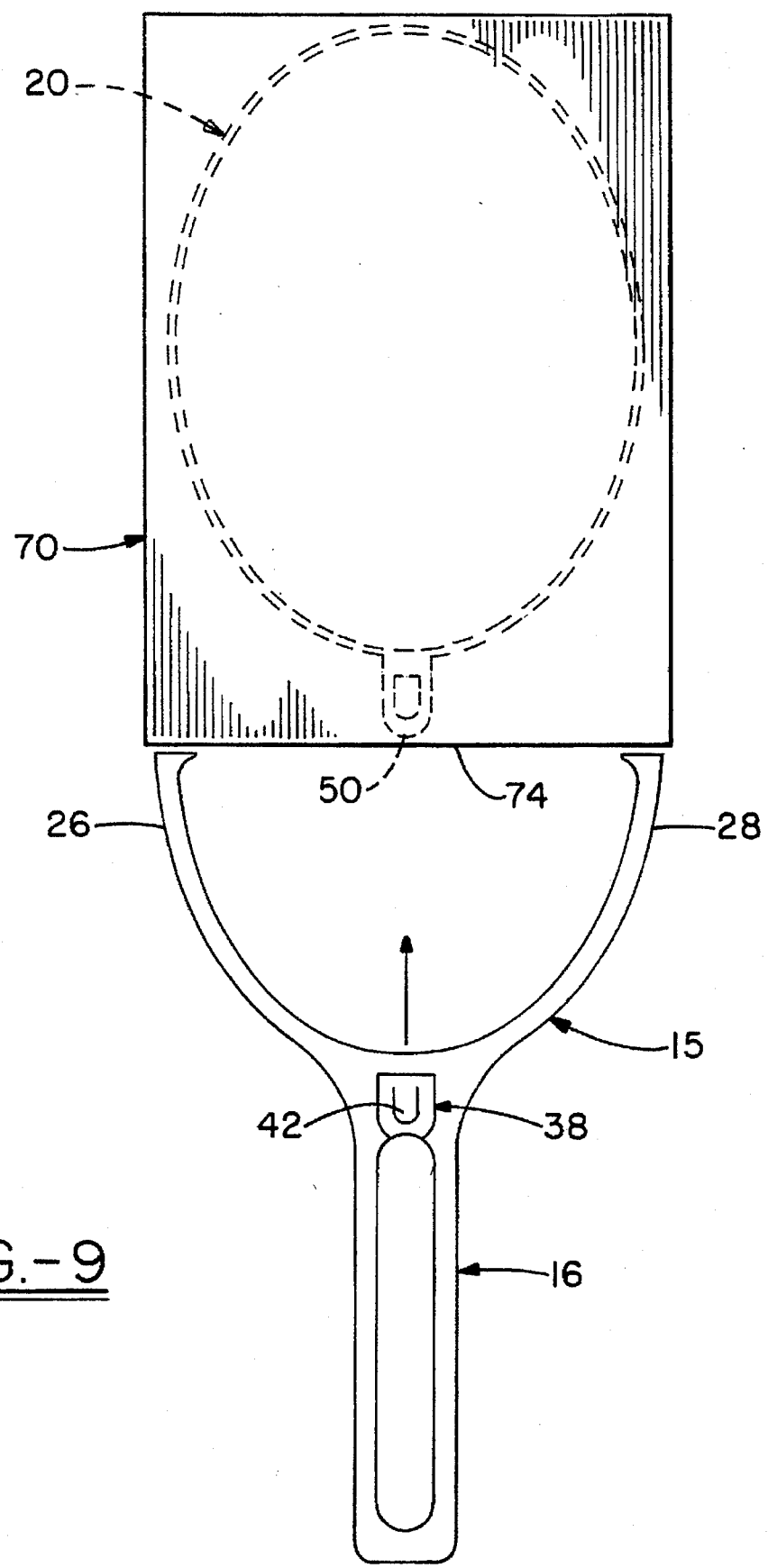
FIG. 9 is a plan view of a case for storage of plural collection members.

Turning to FIGS. 9 and 10, there is also provided a case 70 for storage of a plurality of collection members 20 to be used as refills, after use and disposal of a collection member 20 used in apparatus 10. The case 70 may comprise a plurality of compartments 72, each of which houses a single collection member 20. The case 70 may be open on its bottom end 74, and allows the frame 15, and particularly side members 26 and 28 to slide into a compartment 72 to engage the collection member 20 as previously described.

Before use, each of the collection members 20 provided in case 70 is protected for subsequent use, and facilitates assembly with the frame 15 as noted. Again, a variety of alternative configurations to house a plurality of collection members 20 may be used, and are contemplated herein.

It will be apparent to those skilled in the art that various modifications and variations can be made in the present invention and in its construction without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An insect collection apparatus comprising:

a frame including a handle portion;

a means for mounting a collection means within said frame,
      said means for mounting including a continuous slot formed in said frame for slidably accepting said collection means, said mounting means having the shape of a semi-circle having a semi-circumference, wherein a lower region of said frame joins an upper region of said frame at approximately a midpoint of said semi-circumference; and said collection means extending from said handle portion,
      said collection means having at least one flexible surface for capturing insects including an outside support means configured to be removably mounted with said frame, said at least one flexible surface including a means for adhering to an insect.

2. The apparatus as recited in claim 1, wherein, said collection means having at least one flexible surface is a net, said outside support means is a supporting rim, and said means for adhering is an adhesive disposed on said net.

3. The apparatus as recited in claim 2, wherein, said net further contains an insecticide disposed thereon.

4. The apparatus as recited in claim 1, further comprising retaining means, associated with said frame, for retaining said collection means in association with said frame.

5. The apparatus as recited in claim 4, wherein, said retaining means comprises at least one peg, extending from said frame, which engages said collection means.

6. The apparatus as recited in claim 5, wherein, said outside support means includes a rim having an outwardly extending tab, said tab being engaged by said retaining means.

7. The apparatus as recited in claim 8, wherein, said tab has a hole therein, said tab being designed to extend over said at least one peg so that said at least one peg engages said hole.

8. The apparatus as recited in claim 1, further comprising, a means for raising disposed on at least a first side of said frame, for preventing said net from contacting a surface when said apparatus is rested upon said surface while not in use.

9. The apparatus as recited in claim 8, wherein, said means for raising for preventing said net from contacting a surface comprises at least one outwardly extending tab from said upper region of at least said first side of said frame.

10. An insect collection apparatus comprising:

a frame including a handle portion;

a mesh collection means extending from said handle portion, said collection means including at least one flexible surface for capturing insects including an outside support means configured to be removably mounted with said frame, said at least one flexible surface including a means to adhere to an insect; and a means for mounting said collection means within said frame, said means for mounting having a slot formed in the fame for slidably accepting at least one tab projection on said outside support means, said at least one tab projection enabling a user to remove and insert said collection means without physical contact with the collection means or the outside support means.

11. The apparatus as recited in claim 10, wherein, said mesh collection means further contains an insecticide disposed thereon.

12. The apparatus as recited in claim 11, wherein said frame further comprises a retaining means for said collection means.

13. The apparatus as recited in claim 12, wherein, said retaining means comprises at least one peg extending from said frame, which engages said at least one tab projection on said outside support means.

14. The apparatus as recited in claim 13, wherein, said means for retaining with said at least one peg comprises at least one tab having a hole therein.

15. The apparatus as recited in claim 10, which further comprises, a means disposed on at least a first side of said frame, for preventing said collection means from contacting a surface when said apparatus is rested upon said surface while not in use.

16. The apparatus as recited in claim 15, wherein, said means for preventing said collection means from contacting a surface comprises at least one outwardly extending tab from an upper region of at least said first side of said frame.

* * * * *